Sept. 11, 1956 R. J. BROOKS 2,762,700
PRODUCTION OF FERROUS CHLORIDE AND METALLIC IRON POWDER
Filed Aug. 23, 1949 3 Sheets-Sheet 1

INVENTOR.
R. J. Brooks
BY Paul Olven
Atty.

Sept. 11, 1956  R. J. BROOKS  2,762,700
PRODUCTION OF FERROUS CHLORIDE AND METALLIC IRON POWDER
Filed Aug. 23, 1949  3 Sheets-Sheet 2

INVENTOR.
R. J. Brooks
BY Paul Bliven
Atty.

Sept. 11, 1956  R. J. BROOKS  2,762,700
PRODUCTION OF FERROUS CHLORIDE AND METALLIC IRON POWDER
Filed Aug. 23, 1949  3 Sheets-Sheet 3

INVENTOR.
R. J. Brooks
BY Paul Bliven
Atty.

United States Patent Office 2,762,700
Patented Sept. 11, 1956

2,762,700

PRODUCTION OF FERROUS CHLORIDE AND METALLIC IRON POWDER

Richard J. Brooks, King County, Wash.

Application August 23, 1949, Serial No. 111,938

16 Claims. (Cl. 75—.5)

The present invention relates to powdered iron and process for the production thereof. In more particular, the present invention relates to a process for the chlorination of iron whether in the form of pure iron, low grade iron ore, scrap iron, iron alloys, or any iron compound below chlorine in the electro-chemical series, and reduction of the resulting chloride, to produce pure iron in desired particle size.

In the prior art processes for the production of powdered iron by the reduction of either the oxide or the chloride (B. E. Carl, 2,296,422, September 22, 1942; C. E. Williams 2,418,148, April 1, 1947), no refining operation is possible, with the result that the impurities of the source material remain in the product. Also, in the prior art, the control of the product particle size has been dependent upon careful control of reagent concentration, and temperature during the reduction. Further, the prior art reduction step requires a longer reaction time.

The above and other allied disadvantages of the prior art are eliminated or reduced by the present process, the objects of which are stated hereinafter.

Iron alloys, iron compounds, and iron ores respond to the treatment of the present process to produce a pure iron chloride as a step in the process of producing a pure iron powder. For this reason, applicant uses the term "ferruginous" to include the iron in alloys, iron ores, and iron compounds, as all of these materials contain impurities and all may serve as a source of iron for the process. Some aspects of the process may be performed on a pure iron to obtain a pure powdered iron, and, then there is no need for those steps in the process which insure a pure iron. Then, only those parts of the process which obtain a uniform particle size product need be performed. As the prior art does not show how to obtain an "iron" of the desired purity in quantity, purity and particle size, the two aspects of the process form a unitary process.

An object of the present invention is the production of a pure iron compound from impure material such as an iron ore which may contain an aluminum compound and silicious material.

Another object of the present invention is the reduction of ferric chloride to ferrous chloride by means of heat alone, heat and hydrogen, or iron.

A further object of the present invention is the beneficiation of materials having iron therein as a contaminant.

An object of the present invention is the performance of a process for the treatment of iron ores, alloys, and compounds to produce pure iron.

A further object of the present invention is the production of pure iron in powdered form.

Another object of the present invention is the performance of a process for the production of powdered iron in which the particle size of the powder may be controlled within wide limits.

Yet another object of the present invention is the use of chlorine in a process for the production of powdered iron but in which process the particle size of the resulting powder is independent of the concentration of chlorine or hydrogen chloride in the process.

Still another object of the present invention is the performance of a process for the production of powdered iron in which there is a high rate of reduction from the chloride as compared to the prior art.

Another object of the present invention is to produce an iron powder which requires little or no grinding on the final step in producing the powder.

The above mentioned defects of the prior art are remedied and the above objects achieved by the processes shown in the accompanying drawings in which the flow sheet of:

FIGURE 1

Figure 2:
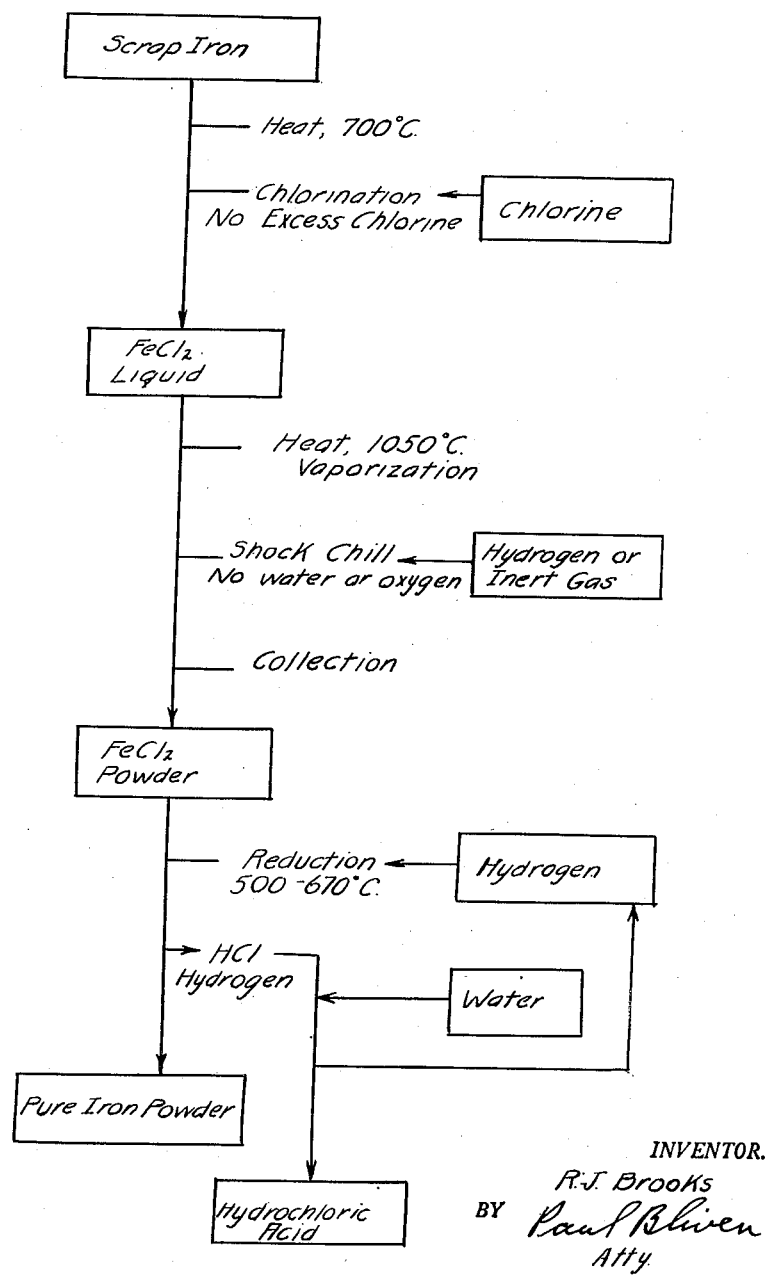
Figure 2 depicts a modification using scrap iron as the raw material, and particular preferred conditions for the process.

The general example, shows the use of iron ore or scrap iron as the iron bearing material that may be used in the process. If the scrap iron does not have impurities which would contaminate the final process, the modification of Figure 2 may be used. The raw iron material is mixed with coke, charcoal, or other carbonaceous material in molar proportion to reduce any iron oxide that may be present in the material. The mixture of iron and carbon is heated above the sublimation temperature of ferric chloride (318° C.) and below the temperature (800° C.) at which many of the usual impurities would be chlorinated, such as aluminum and silicon. Chlorine in excess is then passed thru the mixture with the result that ferric chloride vapor, or gas, is formed. A careful control of the temperature during chlorination will reduce greatly the amounts of other chlorides that will be formed. Applicant has found that a temperature of about 550° C. for the chlorination step is an optimum. The solid gangue from the chlorination is wasted or processed for other values; and the ferric chloride is fractionally condensed to remove any other chlorides that may have been formed and to obtain the excess chlorine which is recycled in the process. The condensed ferric chloride is vaporized and fractionated to again purify the chloride. A single fractionation step may be sufficient to obtain the desired purity of the ferric chloride, and this step may be performed either during condensation or vaporization.

The heating of the ferric chloride after fractionation is carried above 670° C. and below 1035° C., which is the liquid phase temperature range for ferrous chloride. Pure metallic iron is then added to reduce the ferric to ferrous chloride. This gives the ferrous chloride in the liquid phase for easy separation from any unreacted iron. This step can also be carried out in the temperature range above the boiling point of ferrous chloride (1035° C.).

The ferrous iron is vaporized, above 1035° C., and shock, quick, or quench chilled, or cooled, as by the use of a mixing nozzle, by mixing it with an inert gas such as nitrogen, hydrogen, or illuminating gas. By "inert" is meant a gas that will not degrade the ferrous chloride. For this reason the cooling gas should be dry and free of oxygen. The shock chilling of the gaseous ferrous chloride gives a powder. By regulating the velocities in the mixing nozzle, and the rate of cooling, the particle size of the ferrous chloride particles may be regulated. This step of the process is critical in the control of the particle size of the final pure iron powder product. Hydrogen is preferred as the coolant as it does not need to be separated from the powder but may be carried along for use in the subsequent reduction step. This step takes place after the ferrous chloride powder is collected.

The collected ferrous chloride is placed in a rotary kiln or other suitable vessel for reduction with hydrogen. If the shock chilling was done with hydrogen, this hydrogen may be carried with the powder into the reduction stage. An excess of hydrogen must be passed thru the kiln to carry off the hydrogen chloride resulting from the reduction reaction. The reduction is carried out between 500° and 670° C., that is, below the melting point of the ferrous chloride and at a temperature that will rapidly carry the desired reduction forward. The concentration of hydrogen in the reduction process is not critical to the particle size as such is set by the shock chilling step. When the reduction is complete the resulting pure iron powder is removed from the kiln and cooled without exposure to air which would contaminate the powder. The hydrogen chloride resulting from the reduction reaction is collected in water and the excess hydrogen is returned to the cooling step or the kiln.

FIGURE 2

In this example, uncontaminated scrap iron is used as the basic material. Contaminating materials are those which would be chlorinated and vaporized at the temperatures used in the chlorination step. Contamination may be avoided in some instances by lowering the temperature at which the chlorination is carried out. In the present example the preferred temperature for the chlorination step is about 700° C. as at this temperature the chlorination is very rapid. As the iron does not need to be reduced, no carbon is added. The speed of the reaction is, also, a function of the size of the scrap iron pieces charged to the chlorination step. Chlorine is added so as not to be in excess of that required to produce ferrous chloride. As the ferrous chloride is formed, as a liquid, it is removed to prevent its oxidation to ferric chloride.

The liquid ferrous chloride is vaporized and heated to 1050° C. and shock chilled with hydrogen to produce ferrous chloride powder. The size of the powder particles is controlled by the rate of cooling and the velocity of the mixing jets used in obtaining the mixing and cooling of the ferrous chloride vapor.

The reduction of the ferrous chloride is carried out in a kiln with hydrogen at a temperature between 500° and 670° C. The resulting pure iron powder and hydrogen chloride and hydrogen are handled as in Figure 1.

FIGURE 3

Figure 1:
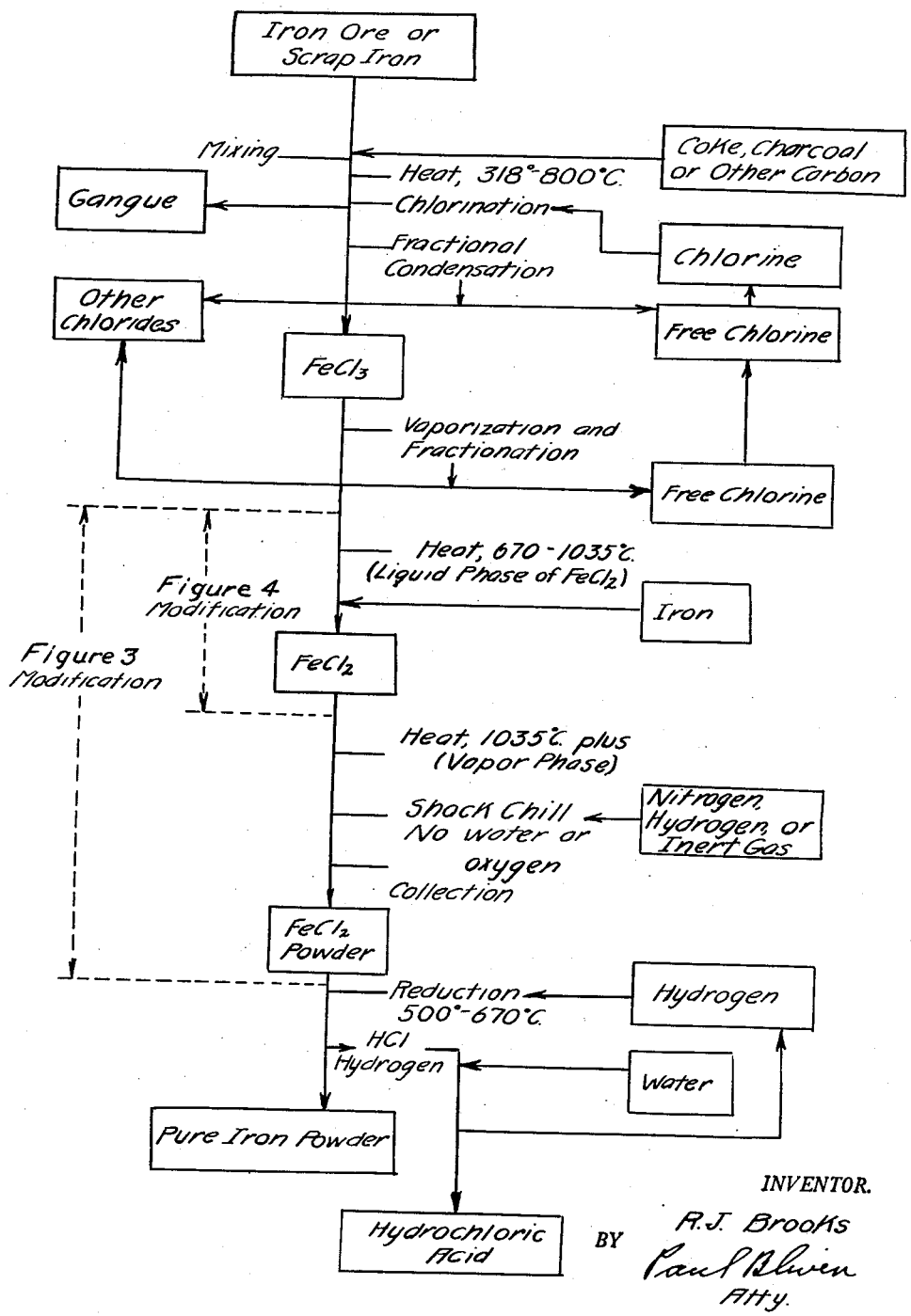
Figure 1 depicts the general process with the limits within which it can be performed.

This example shows a modification of Figure 1 as to the step of reducing the ferric chloride to ferrous chloride. This modified step may be substituted in Figure 1 as indicated in the flow sheet thereof.

Ferric chloride as obtained in Figure 1 is heated above 318° C., the sublimation point for ferric chloride, and below 670° C. the melting point for ferrous chloride. The preferred range is from 500° to 650° C. With the ferric chloride at this temperature, hydrogen is added in excess and the ferric chloride reduced to ferrous chloride in a finely divided form. The uniformity of the particle size is not as good from this modification as that obtained from the process of Figure 1. The ferrous chloride powder obtained from the modification of Figure 3 is returned to the system of Figure 1 and reduced to an iron powder as shown therein.

FIGURE 4

Figure 3:
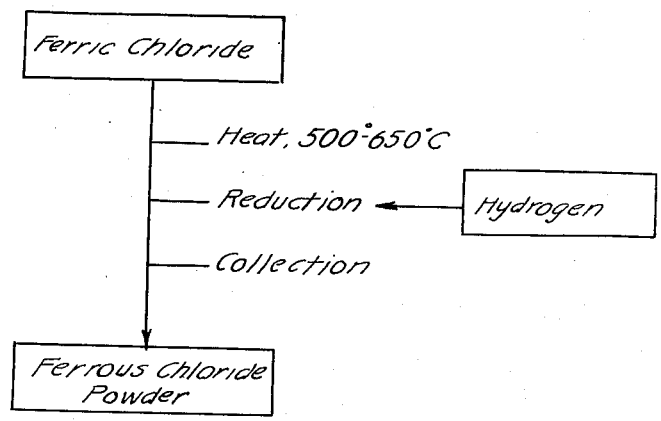
Figure 3 depicts a modification of the process as to the reduction of the ferric to the ferrous chloride with the limits within which the process can be performed.
Figure 4:
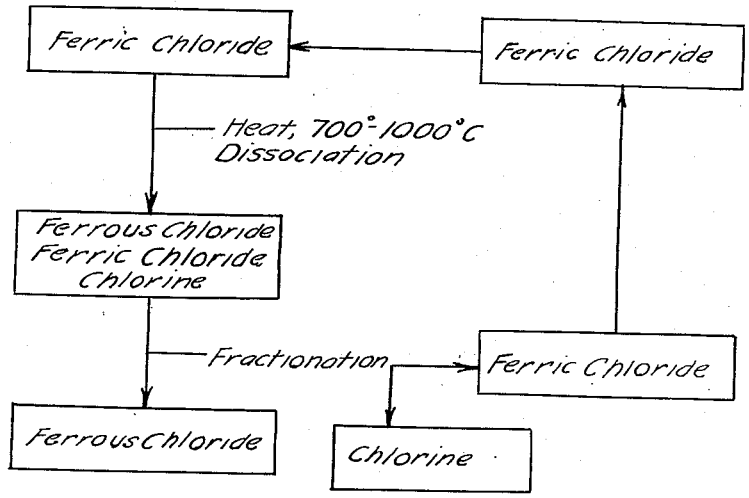
Figure 4 depicts a modification of the process with particular preferred conditions.

This example, as Figure 3, shows a modification of Figure 1 as to the step of reducing the ferric chloride to ferrous chloride. This modified step may be substituted in Figure 1 as indicated in the flow sheet thereof.

Ferric chloride as obtained in Figure 1 is heated above the sublimation point at which some dissociation occurs. The higher the temperature the more rapid the dissociation. The preferred range is in the liquid phase range of ferric chloride, and, particularly from 700° to 1000° C. The dissociation is more rapid at higher temperatures, but in the preferred range the ferrous chloride is easily separated as a liquid from the ferric chloride and chlorine gases. The ferrous chloride is returned to the system of Figure 1, is vaporized, shock chilled, and reduced to an iron powder as shown therein.

Conclusion

By the steps of the present process many ores and iron bearing materials may be processed to obtain iron, and which materials have not previously been susceptible of processing for the removal or obtaining of iron. This process produces an iron in a finely divided state of relatively uniform particle size. Screen tests have shown the product to be only 5% over 100 mesh, 10% between 100 and 200 mesh, and 85% thru 200 mesh, before any grinding. Slight rubbing or grinding rapidly reduces the size of the powder particles. The product is friable. Micro-photographs indicate that the bulk of the powder is in the range of 34 microns. These photographs show no indication of crystals. The purity of the product is over 99% metallic iron. By the term "pure iron" is meant such an iron or iron powder which is free of moisture, oxygen, or other contaminants, either combined with or adhered to such product. Also, by the terms "pure ferric chloride" and "pure ferrous chloride" is meant a chloride free of contaminants such as moisture or oxygen.

Having thus described my invention, I claim:

1. The process of forming pure ferrous chloride, comprising: at 318° to 800° C. treating iron with an excess of chlorine to form pure ferric chloride and adding pure metallic iron to such ferric chloride in the vapor phase between 670° to 1035° C. to reduce it to pure ferrous chloride.

2. The process of forming pure ferrous chloride, comprising: at 318° to 800° C. treating iron with an excess of chlorine to form chlorine compounds including ferric chloride, fractionating said compounds to obtain a pure chloride, and at 670° to 1035° C. contacting pure iron and such ferric chloride to reduce the ferric chloride to ferrous chloride.

3. The process of obtaining pure ferrous chloride from ferric chloride, comprising: heating pure ferric chloride above its sublimation point in the presence of metallic iron and obtaining the pure ferrous chloride formed.

4. In the process of producing powdered iron; at 318° to 800° C., treating a ferruginous material with an excess of chlorine to form chlorine compounds including ferric chloride; treating by revaporization and fractionation said compounds to obtain pure anhydrous ferric chloride; reducing such ferric chloride to ferrous chloride while maintaining such purity; quick chilling such ferrous chloride from the vapor phase with a cold gas inert to such vapor, dry and free of oxygen, to produce a ferrous chloride powder; controlling the rate of such chilling to control the particle size of such powder; and reducing such ferrous chloride powder to iron powder without contamination by moisture or oxygen.

5. In the process of producing powdered ferrous chloride; at 318° to 800° C., treating a ferruginous material with an excess of chlorine to form chlorine compounds including ferric chloride; treating and fractionating said compounds to obtain pure anhydrous ferric chloride; reducing with iron such ferric chloride to ferrous chloride while maintaining such purity; quick chilling such ferrous chloride from the vapor phase with a cold gas inert to such vapor, dry and free of oxygen, to produce a ferrous chloride powder; and controlling the rate of such chilling to control the particle size of such powder.

6. In the process of producing powdered ferrous chloride; at 318° to 800° C., treating a ferruginous material with an excess of chlorine to form chlorine compounds including ferric chloride; treating and fractionating said compounds to obtain pure anhydrous ferric chloride; at the temperature of the liquid phase of ferrous chloride, reducing with iron such ferric chloride to ferrous chloride while maintaining such purity; quick chilling such ferrous chloride from the vapor phase with a cold gas inert to such vapor, dry and free of oxygen, to produce a ferrous chloride powder; and controlling the rate of such chilling to control the particle size of such powder.

7. In the process of producing powdered iron, chlorinating ferruginous material and treating and controlling such chlorination and the resulting product to produce an anhydrous and oxygen free pure ferrous chloride in the vapor phase, quick chilling such vapor with a cold gas inert to such vapor, dry and free of oxygen, to produce a ferrous chloride powder, controlling the rate of such chilling to control the particle size of such powder, and reducing such ferrous chloride powder to iron powder without contamination by moisture or oxygen.

8. In the process of producing powdered iron, forming a pure ferrous chloride vapor, anhydrous and free of oxygen, quick chilling such vapor with a cold gas inert to such vapor, dry and free of oxygen, to produce a ferrous chloride powder, controlling the rate of such chilling to control the particle size of such powder, and reducing such ferrous chloride powder to iron powder without contamination by moisture or oxygen.

9. In the process of forming ferrous chloride powder, treating an iron chloride in the vapor phase so as to quick chill such vapor and form a ferrous chloride powder.

10. In the process of producing pure iron powder, heating ferric chloride under conditions free of moisture and oxygen, and above its sublimation point in the presence of metallic iron to form ferrous chloride for further processing to iron powder.

11. The process of obtaining pure ferrous chloride powder, comprising forming pure ferrous chloride vapor and shock chilling such vapor with a cold gas inert to such vapor, dry, and free of oxygen, whereby pure powdered ferrous chloride is formed.

12. The process of producing powdered iron, comprising: forming pure ferrous chloride by the chlorination of ferruginous material, vaporizing such ferrous chloride, quick chilling such vapor with a cold gas inert to such vapor, dry, and free of oxygen to produce a pure ferrous chloride powder, the rate of such chilling controlling the particle size of such powder, and reducing such ferrous chloride powder to iron powder.

13. The process of producing powdered iron, comprising: forming a pure iron chloride in a vapor state, quick chilling such vapor with a cold gas inert to such vapor, dry, and free of oxygen to produce a pure ferrous chloride powder, the rate of such chilling controlling the particle size of such powder, and reducing such ferrous chloride powder to iron powder.

14. The process of forming pure ferrous chloride, comprising: at 318° to 800° C. treating ferruginous material with an excess of chlorine to form chlorine compounds including ferric chloride, fractionating said compounds to obtain a pure ferric chloride, and at 670° C. to 1035° C. contacting pure iron and such ferric chloride to reduce the ferric chloride to ferrous chloride.

15. In the process of producing iron powder, heating ferric chloride under conditions free of moisture and oxygen, and above its sublimation point in the presence of metallic iron to form ferrous chloride, placing such ferrous chloride in its vapor phase, and quick chilling such vapor, dry, and free of oxygen, to produce a ferrous chloride powder.

16. In the process of producing iron powder, heating ferric chloride under conditions free of moisture and oxygen, and above its sublimation point in the presence of metallic iron to form ferrous chloride, placing such ferrous chloride in its vapor phase, quick chilling such vapor with a cold gas inert to such vapor, dry, and free of oxygen, to produce a ferrous chloride powder, and reducing such chloride powder at temperatures below the melting point of ferrous chloride to produce iron powder.

References Cited in the file of this patent

UNITED STATES PATENTS

| | | |
|---|---|---|
| 1,147,832 | Von Kugelen | July 27, 1915 |
| 1,706,301 | Kendall | Mar. 19, 1929 |
| 1,798,166 | Mensing | Mar. 31, 1931 |
| 1,814,392 | Low | July 14, 1931 |
| 1,853,682 | Hechenbleikner | Apr. 12, 1932 |
| 1,878,013 | Staib | Sept. 20, 1932 |
| 1,917,222 | Bacon | July 11, 1933 |
| 1,938,461 | Prutton | Dec. 5, 1933 |
| 2,020,431 | Osborne | Nov. 12, 1935 |
| 2,025,740 | Hansgirg | Dec. 3, 1935 |
| 2,083,692 | Dorph | June 15, 1937 |
| 2,179,810 | Brill et al. | Nov. 14, 1939 |
| 2,184,884 | Muskat et al. | Dec. 26, 1939 |
| 2,245,077 | Muskat et al. | June 10, 1941 |
| 2,245,358 | Pechukas | July 14, 1941 |
| 2,254,976 | Powell | Sept. 2, 1941 |
| 2,277,220 | Gailey | Mar. 24, 1942 |
| 2,306,184 | Pechukas | Dec. 22, 1942 |
| 2,374,453 | Oliver | Apr. 24, 1945 |
| 2,418,148 | Williams et al. | Apr. 1, 1947 |
| 2,486,912 | Belchetz | Nov. 1, 1949 |
| 2,488,439 | Schaumann | Nov. 15, 1949 |

FOREIGN PATENTS

| | | |
|---|---|---|
| 598,660 | Great Britain | Feb. 24, 1948 |

OTHER REFERENCES

A Comprehensive Treatise on Organic and Theoretical Chemistry, vol. 14, pages 10 and 50, also pages 70–71 and 94. By Mellor. Published by Longmans, Green & Co., New York. (On file in Patent Office Library.)

Thorpe's Dictionary of Applied Chemistry, 4th Edition, vol. VII, page 57. Published in 1946 by Longmans, Green & Co., New York. (On file in Div. 59 of the Patent Office.)

"Anhydrous Chlorides Manufacture," Fiat Final Report 774, pages 18 and 19, May 7, 1946. (Copy in 23—87.)